(12) United States Patent
Kutscher et al.

(10) Patent No.: US 6,266,590 B1
(45) Date of Patent: Jul. 24, 2001

(54) PNEUMATIC SUSPENSION LEVELING SYSTEM FOR VEHICLES

(75) Inventors: Eberhard Kutscher, Dettenhausen; Joachim Lang, Grafenau; Gerhard Lohrmann, Asperg; Reiner Schneider, Dunningen; Udo Walter, Geislingen, all of (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/276,216

(22) Filed: Mar. 25, 1999

(51) Int. Cl.[7] ............................ G06F 7/00; B60G 23/00
(52) U.S. Cl. ........................ 701/37; 701/36; 280/5.5; 280/124.157; 280/124.158; 60/407; 60/415
(58) Field of Search .................................. 701/36, 37, 38; 60/407, 453, 456, 408, 409, 415, 418; 280/5.5, 5.512, 5.513, 5.514, 5.515, 6.152, 6.158, 6.157, 5.501, 124.1, 124.112, 124.157, 124.158; 188/298, 281, 314, 315, 318

(56) References Cited

U.S. PATENT DOCUMENTS

| | | | |
|---|---|---|---|
| 4,629,212 | * 12/1986 | Takizawa et al. | 280/5.519 |
| 4,647,069 | * 3/1987 | Iijima | 280/5.514 |
| 4,696,483 | * 9/1987 | Takizawa et al. | 280/5.514 |
| 4,709,934 | * 12/1987 | Suzuki et al. | 280/6.157 |
| 4,733,876 | * 3/1988 | Heider et al. | 280/6.615 |
| 4,834,088 | * 5/1989 | Jeanson | 188/298 |
| 4,865,349 | * 9/1989 | Church, Jr. | 280/711 |
| 4,934,731 | * 6/1990 | Hiwatashi et al. | 280/5.5 |
| 5,193,849 | * 3/1993 | Holzmann | 280/6.152 |
| 5,600,953 | * 2/1997 | Oshita et al. | 60/407 |
| 5,697,635 | 12/1997 | Köster et al. | 280/711 |
| 5,711,150 | * 1/1998 | Oshita et al. | 60/407 |
| 5,743,553 | 4/1998 | Nagel et al. | 280/707 |

FOREIGN PATENT DOCUMENTS

3808395 A1    9/1989 (DE).

* cited by examiner

*Primary Examiner*—Jacques H. Louis-Jacques
(74) *Attorney, Agent, or Firm*—Mark P. Calcaterra

(57) ABSTRACT

It is proposed that a pneumatic suspension leveling system for vehicles with pneumatic suspension leveling elements assigned to the vehicle axles and/or vehicle wheels, with a compressor and a central pressure accumulator fed by it for the compressed air supply of the pneumatic suspension leveling elements, with an accumulator pressure sensor which detects the air pressure in the central pressure accumulator and generates a signal value correlating thereto, and with an electronic control device which processes the signal values of the central pressure accumulator and induces a pressure charging of the central pressure accumulator by the compressor, when the signal value of the accumulator pressure sensor reaches a predetermined lower threshold signal value and terminates this pressure charging when the signal value of the accumulator pressure sensor reaches a preset upper threshold signal value be improved with respect to its functional capacity. This is achieved by providing an ambient pressure sensor which detects the air pressure in the atmosphere surrounding the vehicle and generates a signal value correlating thereto, whereby the control device processes the signal values of the ambient pressure sensor and varies the upper threshold signal value in function thereof.

2 Claims, 1 Drawing Sheet

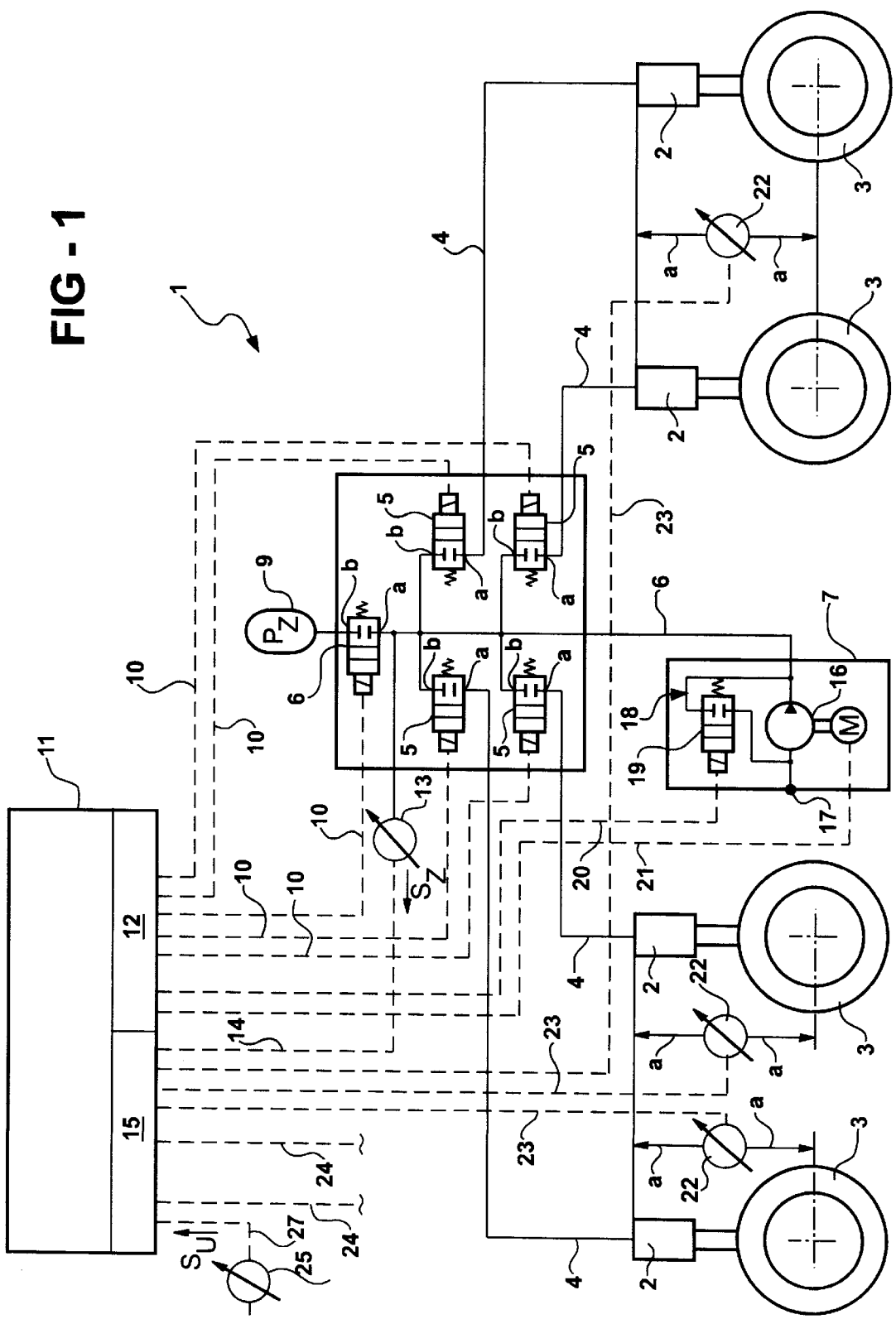

PNEUMATIC SUSPENSION LEVELING SYSTEM FOR VEHICLES

BACKGROUND OF THE INVENTION

1. Field of the Invention

The invention concerns a pneumatic suspension leveling system for vehicles, in particular for motor vehicles, with the characteristics of the introductory clause of claim 1. Such a pneumatic suspension leveling system is known to the art, for example, from DE 38 08 395 A1.

2. Description of Related Art

Pneumatic suspension leveling systems of the kind designated above are advantageously equipped with a central pressure accumulator in order, for example, to make short-term, quick level lifts possible for the vehicle for which the maximum lifting flow of the compressor used does not, as a rule, suffice. Moreover, with the aid of such a central pressure accumulator lifting actions can be carried out without the use of a compressor, whereby, on the one hand, the compressor can remain turned off and is consequently spared and, on the other, level adjustment can respond considerably faster because a compressor warmup phase is eliminated.

The compressed air stored in advance in such a central pressure accumulator is at a pressure level which, in any case, must be higher than the air pressure in the pneumatic suspension leveling elements assigned to the vehicle's wheels when the vehicle is fully loaded. In order to be able to constantly guarantee this pressure level, the pressure in the central pressure accumulator must be monitored, for which purpose an accumulator pressure sensor is provided.

An electronic control device of the pneumatic suspension leveling system implements in this connection, among other things, pressure regulation of the prevailing central pressure accumulator air pressure. At the same time air pressure in the central pressure accumulator is expediently maintained between an upper cutoff pressure and a lower cutoff pressure. In this connection, the lower cutoff pressure corresponds to the minimum pressure with which a lifting action can still be performed for the fully loaded vehicle. The upper cutoff pressure is the maximum pressure up to which the central pressure accumulator can be charged by the compressor. The upper cutoff pressure results, for example, from the functional capacity of the compressor used.

If, for example in the course of a vehicle leveling lift, air pressure in the central pressure accumulator falls below the lower cutoff pressure, the control device induces a recharging or refilling of the central pressure accumulator by the compressor. Such filling or charging action is ended as soon as the air pressure in the central pressure accumulator reaches its upper cutoff pressure.

Usually, with pneumatic suspension leveling systems of the kind designated at the outset, electrically driven, single-stage piston compressors or piston pumps are used. The volume flow delivered by such an electric compressor to a considerable extent is dependent on the respective ambient pressure and back pressure in the central pressure accumulator. Vehicles equipped with a pneumatic suspension leveling system of the kind designated at the outset (e.g., trucks and their trailers or busses) should ordinarily operate to full functional capacity in a range of elevation between 0 meters and 4,000 meters above sea level, which corresponds to an ambient pressure range of approximately 0.625 bar (4,000 meters above zero sea level) to approximately 1 bar (0 meters above zero sea level).

As a consequence of this relatively great pressure range for ambient pressure, the maximum air pressure attainable by the compressor used to charge the central pressure accumulator at low ambient pressure, i.e., at great elevations, is available to a considerably lesser extent at lower elevations than at great ambient pressure, i.e., at sea level. Trials have shown that with a specific compressor type at an ambient pressure of 1 bar a maximum charging pressure for the central pressure accumulator of 18 bar is attainable, while the maximum pressure attainable at an ambient pressure of 0.625 bar with the same compressor type is just 13 bar. In order that reliable charging of the central pressure accumulator can be guaranteed for this compressor type also at an ambient pressure of 0.625 bar, the upper cutoff value for the air pressure in the central pressure accumulator must be set to a value smaller than 13 bar. This means, however, that for the overwhelming majority of all operating conditions in which the vehicle equipped with a pneumatic suspension leveling system of the kind designated at the outset finds itself at an elevation lower than 4,000 m above sea level, the functional capacity of the compressor and, consequently, the advantages resulting from the use of a central pressure accumulator can be taken advantage of only to a reduced extent.

SUMMARY OF THE INVENTION

The present invention concerns itself with the problem of improving the functional capacity of a pneumatic suspension leveling system of the kind designated at the outset.

This problem is solved in accordance with the invention by a pneumatic suspension leveling system with the characteristics of claim 1.

The invention is based on the general idea of selecting the upper cutoff pressure, up to which the central pressure accumulator can be filled with air, in function of the respectively prevailing ambient pressure. In this manner it is possible, at higher ambient pressure, to fill the central pressure accumulator it higher air pressure than would be possible at a lower ambient pressure. The resulting consequence is that at higher ambient pressures the central pressure accumulator can make available a significantly greater air volume flow, whereby the functional capacity, in particular the speed with which an increase in pressure can be carried out in the pneumatic suspension leveling elements, is considerably increased. Only at extreme elevations, i.e., at low ambient pressures, does the pneumatic suspension leveling system in accordance with the invention exhibit the same functional capacity as a comparable conventional pneumatic suspension leveling system without the phasing in accordance with the invention of the upper cutoff pressure in the central pressure accumulator in function of the ambient pressure.

Modification of the upper cutoff pressure and the upper threshold signal value of the accumulator pressure sensor correlating to it expediently takes place approximately proportional to the ambient pressure and to the signal value of the ambient pressure sensor correlating to it.

In a preferred special embodiment of the pneumatic suspension leveling system in accordance with the invention the control device is able to vary the lower threshold signal value correlating to the lower cutoff pressure in the central pressure accumulator in function of the ambient pressure sensor signal values correlating to the ambient pressure. In this manner it is guaranteed that in cases of increased upper cutoff pressure an increased lower cutoff pressure likewise exists. By matching the upper and lower threshold value for the start of central accumulator charging and for the end of central accumulator charging, it is guaranteed that, at different ambient pressures, the pressure differential between these threshold values remains approximately equal, with the result that at different ambient pressures central pressure accumulator charging frequencies of the same magnitude are to be expected. The raising of the lower threshold value at high ambient pressure has the advantage that as a result thereof driving at lower elevations a distinctly higher minimum pressure can always be made available for system supply. On the other hand, lowering of the lower threshold value at low ambient pressure (e.g., mountain driving) has as a result that central pressure accumulator charging frequency does not increase, whereby the compressor is spared. This measure additionally results in the fact that, with decreasing ambient pressure, e.g. during travel through a pass, unnecessarily frequent accumulator charging actions are avoided, whereby the compressor is also spared.

In an especially preferred special embodiment of the pneumatic suspension leveling system in accordance with the invention the functional relationship between the lower threshold signal value and the signal value of the ambient pressure sensor can be selected in such a way that at every ambient pressure the quotient from the upper and lower cutoff pressure is approximately of the same magnitude and remains constant. With the aid of this measure, the pneumatic suspension leveling system can implement pneumatic suspension leveling and level adjustment in the entire ambient pressure range with essentially constant control and adjustment behavior.

BRIEF DESCRIPTION OF THE DRAWING

Additional important characteristics and advantages of the pneumatic suspension leveling system in accordance with the invention result from the subclaims, from the drawing and from the following description of a preferred exemplified embodiment based on the drawing.

FIG. 1 shows a schematic basic representation of the pneumatic suspension leveling system in accordance with the invention.

DESCRIPTION OF THE PREFERRED EMBODIMENT

In conformity with FIG. 1, a pneumatic suspension leveling system 1 according to the invention exhibits four pneumatic suspension leveling elements 2 which, in each case, are assigned to a wheel 3 of a vehicle otherwise not depicted. It is, however, obvious that the pneumatic suspension leveling system 1 in accordance with the invention can also be used with a vehicle with another number of wheels.

Each of the pneumatic suspension leveling elements 2 is connected via a pressure line 4 to a first connection 5a of an electromagnetically switchable cutoff valve 5. Each of these cutoff valves 5 is connected via its second connection 5b to a pressure line 6 which, on the one hand, is connected to a compressor 7 and, on the other, to a first connection 8a of a further electromagnetically switchable cutoff valve 8. The second connection 8b of the cutoff valve 8 is connected to a central pressure accumulator 9.

The cutoff valves 5 and 8 are connected in each case separately via electrical switching lines 10 to an electronic control device 11 of the pneumatic suspension leveling system 1 at its output side 12. Such control device 11 works preferably computer-aided and has corresponding processors, memory and programs.

An accumulator pressure sensor 13 is connected to the pressure line 6, which sensor generates a signal value $S_z$ correlating to the pressure measured and transmits this signal value $S_z$ via a corresponding electrical signal line 14 to a input side 15 of the control device 11.

The compressor 7 comprises in the exemplified embodiment depicted an electrically driven pump 16 which sucks in ambient air through an intake 17 symbolized by a dot and feeds this air into the pressure line 6. In addition, the compressor 7 contains a bypass 18 by means of which, in the event of exceedingly high vehicle level, air, bypassing the pump 16 can be released out of the pneumatic suspension leveling elements 2 (e.g., shock-absorbing legs) through a discharge valve 19 into the atmosphere. The discharge valve 19, likewise electromagnetically switchable, is connected via a corresponding electrical switching line 20 to the output side 12 of the control device 11. The pump 16 is also connected via an electric switching line 21 to the output side 12 of the control device 11.

In each case a level sensor 22 is assigned to the wheels 3 of an axle, not shown, bearing two wheels 3 whereby each level sensor 22 is connected via a corresponding signal line 23 to the input side 15 of the control device 11 via the signal lines 23. The level sensors 22 detect, for example, the distance between the vehicle axles and wheel axles and a vehicle's body, which is symbolically depicted by the arrows a. A signal value correlating to the distance measured is then made available to the control device 11. These signal values form an important parameter which is taken into consideration by the control device 11 during the level regulation and/or spring suspension of the vehicle. Additional, in this regard important parameters, such as, e.g., current steering angle and current vehicle speed, are fed via signal lines 24 to the input side 15 of the control device 11, which are connected to corresponding sensors or the like.

In addition thereto, at an appropriate point 26 symbolized by a dot, the pneumatic suspension leveling system 1 in accordance with the invention has an ambient pressure sensor 25 which measures atmospheric pressure $P_U$ in vehicle's surroundings. The ambient pressure sensor 25 generates a signal value $S_U$ correlating to the current, measured ambient pressure $P_U$, which signal is routed via a corresponding signal line 27 to the input side 15 of the control device 11.

The pneumatic suspension leveling system 1 in accordance with the invention operates as follows:

Air pressure $P_z$, which lies between a lower pressure cutoff value $P_{Zu}$ and an upper pressure cutoff value $P_{Zo}$, prevails in the central pressure accumulator 9. When the control device 11 determines that a level lift is necessary, the cutoff valve 8 and the corresponding cutoff valves 5 are switched via the appropriate signal lines 10 to the corresponding through positions. In this connection, the lower cutoff pressure $P_{Zu}$ is greater than the maximum air pressure required for the pneumatic suspension leveling elements 2 to effect a level lift of the fully loaded vehicle. Through the switching of the valves 5 and 8 the corresponding pneumatic suspension leveling elements 2 are charged with the air pressure $P_Z$ prevailing in the central pressure accumulator 9, whereby the said air pressure drops during this level lift. Because the air pressure $P_Z$ prevailing in the central pressure accumulator 9 also exists in the pressure line 6 on account of the open valve 8, this pressure $P_Z$ can be detected by the accumulator pressure sensor 13, whereby corresponding signal values $S_Z$ are generated and routed to the control device 11. With this, a pressure measurement takes place expediently always before and after a level lifting action. Prior thereto: In order to check whether accumulator pressure $P_Z$ suffices for a level lifting action. Thereafter: To check whether the central pressure accumulator 9 must be recharged in conformity with the filling limits. During a level lifting action no clear-cut statement can be made with this pressure sensor array regarding central accumulator pressure $P_Z$ because at the time the pressure line 6 is connected to at least one of the pneumatic suspension leveling elements 2.

When the pressure $P_z$ in the central pressure accumulator 9 reaches the lower cutoff pressure $P_{Zu}$, the control device 11 reacts and induces a charging of the central pressure accumulator 9 by the pump 16 via the switching line 21. At the same time, the pump 16 aids the level lift in the process insofar as the corresponding cutoff valves 5 are still open. The pump 16 remains activated as long as the pressure $P_z$, in the central pressure accumulator 9 attains the upper cutoff pressure $P_{Zo}$, whereupon the control device 11 induces pump 16 switch-off and, if necessary, closing of the cutoff valve 8.

The functional capacity of the pneumatic suspension leveling system 1 depends substantially on the pressure level prevailing in the central pressure accumulator 9, whereby this pressure level $P_z$, as explained, moves between a lower cutoff pressure $P_{Zu}$ and an upper cutoff pressure $P_{Zo}$. The higher the available pressure level $P_Z$, the better, in particular, the faster a level lift can be implemented.

The pressure level attainable in the central pressure accumulator 9 depends in this connection on the functional capacity of the compressor 7 and pump 16 used. The functional capacity of pump 16 depends, on the one hand, on the respectively prevailing ambient pressure $P_U$, whereby with decreasing ambient pressure $P_U$ the maximum end pressure attainable by the pump 16 similarly decreases. For example, a specific pump type at an ambient pressure of 1 bar enables charging of the central pressure accumulator 9 to 18 bar. In contrast thereto, with an ambient pressure of 0.625 bar only an end pressure of 13 bar can be achieved in the central pressure accumulator 9 with the same pump 16. In order not to unnecessarily load the compressor 7, the aforementioned upper cutoff pressure $P_{Zo}$ of the central pressure accumulator 9, at which the pump 16 is switched off by the control device 11, must in any case be below the maximum end pressure attainable by the pump 16.

Conventional pneumatic suspension leveling systems take into consideration the influence of the ambient pressure $P_U$ to the extent that for the smallest ambient pressure (in the example 0.625 bar) to be expected the upper cutoff pressure $P_{Zo}$ is set to a value below the maximum end pressure attainable (in the example 13 bar) from the pump 16 used at this ambient pressure (0.625 bar), e.g. to $P_{Zu}$=12 bar. In contrast thereto, with the pneumatic suspension leveling system 1 in accordance with the invention ambient pressure $P_U$ is taken into consideration to the extent that the upper cutoff pressure $P_{Zo}$, and in exemplified embodiment also, the lower cutoff pressure$)_{Zu}$ are varied in function of the ambient pressure $P_U$.

To this end the control device 11 processes the signal $S_U$ generated by the ambient pressure sensor 25 and determines from it the respective current values for the lower cutoff pressure $P_{Zu}$, and the upper cutoff pressure $P_{Zo}$ for the central pressure accumulator 9. In this connection, the determination of the stated pressure values can, for example, be performed with the help of the following equations:

$$P_{Zo}=P_{ZoReference} \cdot [1-K \cdot (P_{UReference}-P_U)]$$

$$P_{Zu}=P_{ZuReference} \cdot [1-K \cdot (P_{UReference}-P_U)]$$

where:
$P_{Zo}$=calculated upper cutoff pressure in the central pressure accumulator 9,
$P_{ZoReference}$=preset upper cutoff pressure at a reference ambient pressure,
K=gradient of the equation,
$P_{UReference}$=reference ambient pressure,
$P_U$=measured ambient pressure
$P_{Zu}$=calculated lower cutoff pressure in the central pressure accumulator 9,
$P_{ZuReference}$=preset lower cutoff pressure at a reference ambient pressure,
K=gradient of the equation,
$P_{UReference}$=reference ambient pressure,
$P_U$=measured ambient pressure.

If, for example, the prevailing ambient pressure at sea level of approximately 1 bar is assumed as the reference ambient pressure $P_{UReference}$ and the lower cutoff pressure $P_{ZuReference}$ at 1 bar ambient pressure $P_{UReference}$ is set 13 bar and upper cutoff pressure $P_{ZoReference}$ at 1 bar ambient pressure set to 16 bar and if for the above equations a value of $\frac{2}{3}$ is assumed as gradient K, the relation shown in the following table results between ambient pressure values $P_U$ selected by way of example and the lower cutoff pressure $P_{Zu}$ and the upper cutoff pressure $P_{Zo}$:

| $P_U$ (bar) | $P_{Zu}$ (bar) | $P_{Zo}$ (bar) |
|---|---|---|
| 0.625 | 9.75 | 12.00 |
| 0.650 | 9.97 | 12.27 |
| 0.675 | 10.18 | 12.53 |
| 0.700 | 10.40 | 12.80 |
| 0.725 | 10.62 | 13.07 |
| 0.750 | 10.83 | 13.33 |
| 0.775 | 11.05 | 13.60 |
| 0.800 | 11.27 | 13.87 |
| 0.825 | 11.48 | 14.13 |
| 0.850 | 11.70 | 14.40 |
| 0.875 | 11.92 | 14.67 |
| 0.900 | 12.13 | 14.93 |
| 0.925 | 12.35 | 15.20 |
| 0.950 | 12.57 | 15.47 |
| 0.975 | 12.78 | 15.73 |
| 1.000 | 13.00 | 16.00 | where:
$P_{UReference}$=1 bar,
K=$\frac{2}{3}$,
$P_{Zu}$(1 bar)=13 bar,
$P_{Zo}$(1 bar)=16 bar.

What is claimed is:
1. In an improved pneumatic suspension leveling system for a vehicle with pneumatic suspension leveling elements assigned to vehicle wheels and axles, and with a compressor and central pressure accumulator for pressurizing and storing air to be selectively supplied to the pneumatic suspension leveling elements, and with an air pressure sensor which senses and air pressure level (Pz) in the central pressure accumulator and which generates a signal value (Sz) correlated to the air pressure level therein, and an electronic control device for receiving and processing the signal value (Sz) for initiating a charging of the central accumulator with compressed air from the compressor when the signal value (Sz) reaches a predetermined lower threshold signal value (Szu) and for terminating charging of the central accumulator when the signal value (Sz) reaches a predetermined upper threshold signal value (Szo), the improved system comprising: an ambient air pressure compensator including an ambient pressure sensor (25) for detecting the atmospheric air pressure level (Pu) about the vehicle; said ambient pressure sensor (25) generating and transmitting a signal value (Su) corresponding to the atmospheric air pressure level to the electronic control unit (11) for processing to produce a change in the upper threshold signal value (Szo); the functional relationship between the upper threshold signal value (Szo) and the signal value (Su) of the ambient pressure sensor (25) for terminating compressor operation is selected so that an upper cutoff pressure (Pzo) in the pressure accumulator (9) corresponding to the upper threshold signal value (Szo) rises with increasing ambient air pressures (Pu) and decreases with decreasing ambient air pressures (Pu); the functional relationship between the upper threshold signal value (SzO) and the signal value (Su) of the ambient pressure sensor (25) is selected so that the corresponding upper cutoff pressure (Pzo) corresponding to the upper threshold signal value (Szo) varies in the central accumulator (9) proportionally to the ambient air pressure (Pu).

2. The improved pneumatic suspension level system as set forth in claim 1 in which the functional relationship between the upper threshold signal value (Szo) and the signal value (Su) of the ambient pressure sensor (25) is selected so that an upper cutoff pressure (Pzo) which corresponds to the upper threshold signal value (Szo) is varied in the central pressure accumulator (9) approximately proportionally to the ambient air pressure (Pu) and the upper cutoff pressure (Pzo) corresponding to the upper threshold signal value (Szo) is calculated by the equation:

$$Pzo = PzoReference \times [1 - K \times (PuReference - Pu)]$$

whereby
- Pzo=calculated upper cutoff pressure in the central accumulator (9),
- PzoReference=Preset upper cutoff pressure at a reference ambient pressure,
- K=gradient of the equation,
- PuReference=reference ambient pressure,
- Pu=measured ambient pressure.

* * * * *

UNITED STATES PATENT AND TRADEMARK OFFICE
CERTIFICATE OF CORRECTION

PATENT NO. : 6,266,590 B1
DATED : July 24, 2001
INVENTOR(S) : Kutscher et al.

It is certified that error appears in the above-identified patent and that said Letters Patent is hereby corrected as shown below:

<u>Title page,</u>
After Item [22], please insert the following information:

-- [30]  Foreign Application Priority Data

March 27, 1998  (DE)………………………….. 198 13 672 --.

Signed and Sealed this

Twenty-second Day of July, 2003

JAMES E. ROGAN
*Director of the United States Patent and Trademark Office*